United States Patent [19]
Yang

[11] Patent Number: 5,285,132
[45] Date of Patent: Feb. 8, 1994

[54] DISPLAY DEVICE
[75] Inventor: George Yang, Tainan, Taiwan
[73] Assignee: U.S. Philips Corporation, New York, N.Y.
[21] Appl. No.: 60,321
[22] Filed: May 11, 1993
[30] Foreign Application Priority Data
  Jun. 25, 1992 [EP] European Pat. Off. ......... 92201871.8
[51] Int. Cl.$^5$ .................................................. H01J 29/56
[52] U.S. Cl. .......................................... 315/370; 315/8; 315/85
[58] Field of Search .................... 315/370, 8, 85; 358/245, 243
[56] References Cited
  U.S. PATENT DOCUMENTS

| | | | |
|---|---|---|---|
| 4,315,306 | 2/1982 | Tol et al. | 363/126 |
| 4,654,717 | 3/1987 | Stoughton | 358/243 |
| 5,231,332 | 7/1993 | Beaumont et al. | 315/85 |

Primary Examiner—Theodore M. Blum
Attorney, Agent, or Firm—Edward W. Goodman

[57] ABSTRACT

A display device is described, comprising a display tube and a deflection unit. The high DC voltage (EHT) is generated by a line output transformer, this transformer receiving the flyback pulse during the line flyback period. This flyback pulse is transferred through the line output transformer and supplied as the high DC voltage (EHT) to the inner coating of the display tube. Variation of the high DC voltage causes radiation in front of the display tube. To overcome this radiation, a conductor is coupled between the ground terminal (or a metal shield coupled to the ground terminal) of the line output transformer and the outer coating of the display tube. This conductor has at least one turn around one of the coils of the deflection unit for generating a complementary variation to overcome the radiation in front of the display tube.

4 Claims, 1 Drawing Sheet

DISPLAY DEVICE

BACKGROUND OF THE INVENTION

1. Field of the Invention

The invention relates to a display device comprising a display tube having at least one control electrode for generating an electron beam, a display screen for displaying a video signal and an inner coating at the inside of the display tube and an outer coating at the outside of the display tube, a deflection unit for deflecting the electron beam across the display screen, said deflection unit comprising at least a line deflection coil, a field deflection coil and a line output transformer having a primary winding coupled to a line deflection section of the deflection unit and a secondary winding having a first connector coupled to a ground terminal and a second connector coupled to the inner coating of the display tube for generating a high DC voltage.

2. Description of the Related Art

Such a display device is generally known. For example, U.S. Pat. No. 4,315,306 describes a line output transformer (LOT) for use in a display device as described above. The secondary winding of the line output transformator generates the high DC voltage (EHT) which is required for display. The display tube may be the picture tube of a television receiver or monitor. For this type of equipment, there are safety regulations specifying that certain electrical fields in the vicinity of the device may not exceed certain limits because such fields can be hazardous to the health of people using these devices. For example, the AEF2, which is the term used for the alternating electrical field in band 2 (the frequency band comprising the horizontal deflection frequencies), may not exceed 2.5 V/m at a distance of 0.5 m from the center of the screen of the display tube.

In general, all parts having an alternating voltage with a frequency in band 2 will contribute to the AEF2. The back and the sides of a monitor/television receiver can easily be shielded by means of a metal housing or an electrically conductive coating. It is more difficult to shield the front side of the display tube because this side comprises a glass display screen. The inner side of the cone and the inner side of the display screen of the display tube are electrically conductive and are connected to the anode contact to which the high voltage conductor of the line output transformer is to be connected. Ripple on the high DC voltage EHT is thus coupled to the inside of the display screen and consequently the display screen acts as a generator for the AEF2 at the front side of the display tube. It has been found that a ripple of 15-25 V on the EHT of about 20 kV occurs in current commercially available monitors. Depending on the display screen size, this ripple will cause an AEF2 value which exceeds the safety requirements. For example, a ripple of 21 V and an AEF2 value of 4 V/m have been found on a 17 inch monochrome monitor. The ripple is partly due to the internal stabilization of the EHT, but a major part is caused by capacitive coupling of the flyback pulse on the horizontal deflection coil(s) to the inner coating of the display tube. In principle, it would be possible to reduce the AEF2 value by shielding the display tube and/or the display screen by means of an electrically conductive coating. Although such coatings are available, they are very expensive and not suitable for mass production. Therefore, it would be preferable to eliminate or reduce the cause of the AEF2. This could be achieved by providing an electrically conductive layer between the deflection unit and the display tube. However, it is difficult to obtain a satisfactory isolation between this layer and the horizontal deflection coil(s). Moreover, this conductive layer must have a conductivity which is sufficient to perform its shielding function, but low enough to prevent excessive eddy currents. As it is difficult to meet all these requirements, this solution has not been used in practice.

SUMMARY OF THE INVENTION

It is therefore an object of the invention to provide a practical and inexpensive solution to the problem of reducing the AEF2 value in front of the display screen of a display tube of a display device. For this purpose, a display device according to the invention is characterized in that the first connector of the secondary winding is coupled to the outer coating of the display tube by means of a conductor which has at least one turn around one of the coils of the deflection unit.

The invention is based on the recognition that the value of the AEF2 can be reduced by adding opposite pulses to the display tube (cone) thus compensating for the AC pulses on the high voltage EHT at the inside of the display tube. This is a very simple solution which can be performed by the set maker of the display device. It is not necessary to ask, for example, the manufacturer of the line output transformer to give the line output transformer a specific design for the purpose of this correction.

A preferred embodiment of a display device according to the invention is characterized in that the at least one turn of the conductor is formed around a width coil of the deflection unit. The at least one turn of the conductor can easily be formed around the width coil. Instead of the width coil the linearity coil may alternatively be used.

BRIEF DESCRIPTION OF THE DRAWING

These and other aspects of the invention will be apparent from and elucidated with reference to the embodiments described hereinafter.

In the drawing.

DESCRIPTION OF THE PREFERRED EMBODIMENT

Figure 1:
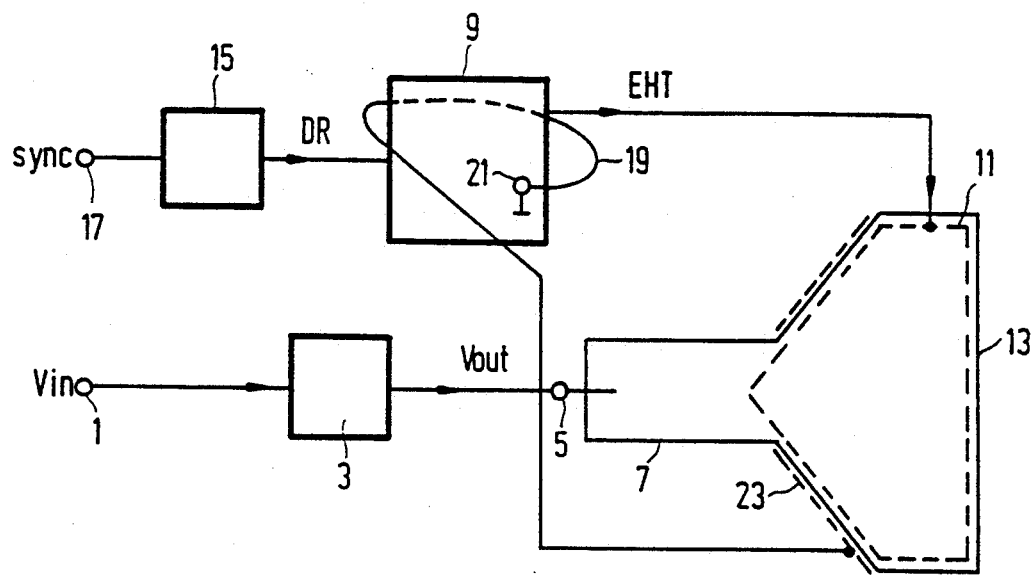
FIG. 1 is a schematic representation of a display device according to the invention.

FIG. 1 shows a display device W according to the invention. The display device receives a video signal Vin at an input 1. This input is coupled to a video signal processing circuit 3. After processing in the video signal processing circuit (for example, YUV to RGB conversion, filtering etc.), an output video signal Vout is supplied by an output to a control electrode 5 of a display tube 7. The control electrode generates an electron beam which will be deflected (as usual) by a deflection unit 9. The deflection unit comprises a line deflection coil, and a field deflection coil and for example, a width coil and a linearity coil (in FIG. 1 the coils are not shown). The deflection unit generates a high DC voltage (EHT) which is supplied to an inner coating 11 of the display tube. This high DC voltage is necessary to accelerate the electrons of the electron beam to a display screen 13 of the display tube.

The deflection unit 9 receives a drive signal DR from a synchronization processing circuit 15, which receives a synchronizing signal sync from an input 17.

As described hereinbefore, all elements conveying an alternating voltage with a frequency in band 2 across them (inter alia, the horizontal deflection frequencies) will contribute to the alternating electrical field in band 2 (AEF2). The inner side of the cone and the inner side of the display screen of the display tube are electrically conductive and are connected to the anode contact to which the high voltage conductor of the line output transformer is to be connected. Ripple on the high DC voltage EHT is thus conveyed to the inside of the display screen and consequently the display screen acts as a generator for the AEF2 at the front side of the display tube. It has been found that a ripple of 15-25 V on the EHT of about 20 kV occur in current commercially available monitors. Depending on the display screen size, this ripple will cause an AEF2 value which exceeds the safety requirements. For example, a ripple of 21 V and an AEF2 value of 4 V/m have been found on a 17 inch monochrome monitor. The ripple is partly due to the internal stabilization of the EHT, but a major part is caused by capacitive coupling of the flyback pulse on the horizontal deflection coil(s) to the inner coating of the display tube.

At the zero-degree position, the radiation is caused by a variation of the high DC voltage EHT on the inside coating of the display screen. The EHT is generally a kind of DC voltage, but there is still an AC ripple on the EHT. Basically, if the EHT of the line output transformer is higher, (i.e., line output transformer incoming flyback pulse is higher) the ripple amplitude field will get worse, because the AC ripple is a real source for AEF2 radiation. The AC ripple is caused, inter alia, by the line output transformer design, because the EHT is generated by the line output transformer which requires an AC flyback pulse on the primary side, subsequently this AC pulse is induced to the secondary side of the line output transformer, then rectified by high voltage diodes and stray capacitances, whereafter the AC flyback pulse results in the high DC voltage or EHT. However this EHT is not a real DC voltage, because the rectification cannot be achieved completely and the originally generated pulse for the EHT is an AC flyback pulse, so there is still AC ripple on the EHT. The AC ripple is also produced by the deflection yoke (that is the horizontal and vertical deflection coil(s)), because the yoke has a position close to the display tube as compared with the other deflection components which also have AC flyback pulse. Thus this AC pulse will be easily coupled into the display tube inner coating which is connected to the EHT.

The AC ripple is further produced by radiation from the line output transformer to the outer coating of the display tube first, and is then coupled into the inner coating. Since the line output transformer conveys an AC flyback pulse and has a larger core than the other deflection components such as linearity coil, width coil, convergence adjusting coil, it is easy to radiate to the outer coating of display tube. although the position of the transformer is the farthest away from the display tube. (Experiments have proved that the radiation is more serious if the line output transformer position is shifted towards the display tube)

To overcome radiation, the line output transformer can be shielded by a metal shield which is coupled to the ground terminal.

Finally these AC ripple may be caused by, inter alia, the linearity coil, the H-width coil and the line convergence adjusting coil which is attached to the yoke side. As described above AC (positive pulse) ripples are generated by deflection components such as line output transformer, yoke, width coil, linearity coil, and by coupling or inducing paths to EHT. Consequently, the best solution is to suppress or compensate AC ripples by inducing negative pulses from these deflection components. This may be realized by using a ground wire (conductor) with isolated layer and make at least one turn around one of the deflection components (for example width coil) and by connecting the ground wire to the outer coating of the display tube. The negative pulse will then be coupled into the inner coating of the tube, so that the AC ripples (i.e. positive pulse) on the EHT can be compensated for.

FIG. 1 shows diagrammatically a conductor 19 which is coupled at one end to a ground terminal 21 of the deflection unit and at the other end to an outer coating 23 of the display tube. This conductor 19 has at least one turn around one of the coils of the deflection unit.

Instead of coupling the conductor to the ground terminal it may also be coupled to a metal shield which can be built around the line output transformer and is coupled to the ground terminal.

Figure 2:
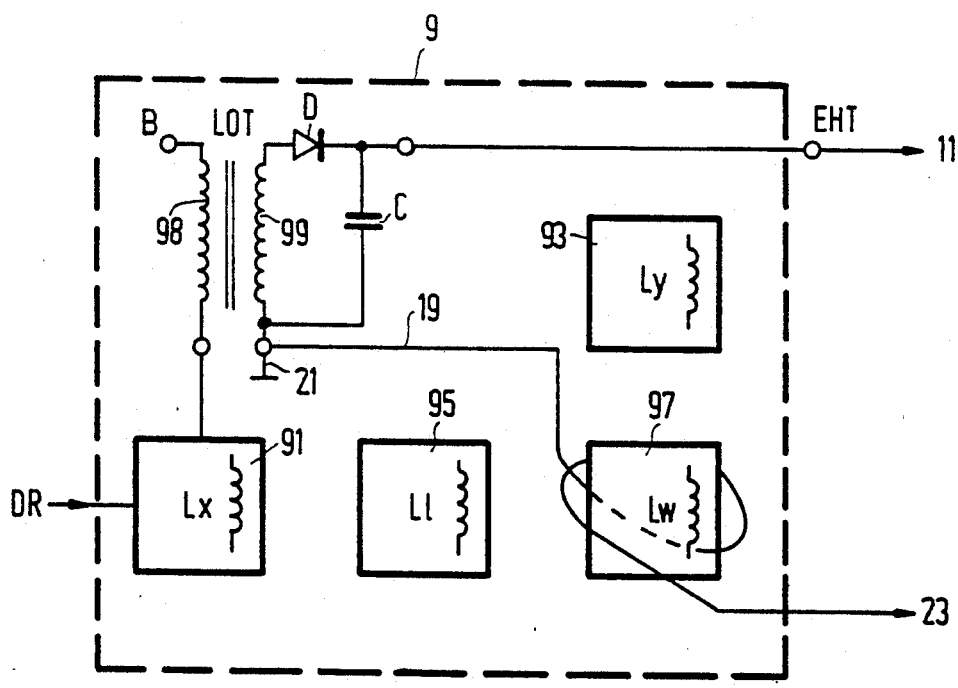
FIG. 2 shows the deflection unit of the display device according to the invention in more detail.

FIG. 2 shows the deflection unit 9 in more detail. The deflection unit has a line deflection section 91 which receives the drive signal DR. The line deflection section comprises a line deflection coil Lx which is arranged around the display tube. The line deflection section also comprises the usual components such as a transistor, a diode, a trace capacitor and a retrace capacitor. These components (except for the line deflection coil) are not shown in FIG. 2 because they are well known to those skilled in the art, and are beyond the scope of the present invention. The line deflection section operates in the conventional manner. By supplying an essentially sawtooth shaped signal (S-corrected if necessary) through the line deflection coil, the electron beam(s) are deflected in the horizontal direction (the trace period). After this trace period and during the retrace period the electron beam will move quickly to the left side of the display screen, to a position slightly lower than the preceding line.

During this retrace period, the line deflection section of the deflection unit generates the flyback pulse which is used by the line output transformer to generate the high DC voltage (EHT).

The deflection unit further has a field deflection section 93, of which only the field deflection coil Ly is shown. The field deflection section operates in the same way as usual, so the field deflection coil receives, in operation, an essentially sawtooth shaped signal to deflect the electron beam(s) in the vertical direction. The field deflection section 93 will also receive a control signal, for example a sawtooth signal, the field deflection section is beyond the scope of the invention and will not be further described.

The line deflection section 91 of the deflection unit 9 will normally also comprise a linearity coil Ll. In FIG. 2 this has been shown schematically by a linearity section 95, comprising the linearity coil Ll.

The deflection unit generally also comprises a width control section 97, having a width coil Lw. The width control section regulates the width of the displayed video signal, i.e. so the width of a displayed video line.

As usual, the line deflection section 9 is coupled in series with a primary winding 98 of a line output transformer LOT. The other terminal of the primary winding is coupled to a DC voltage source B. One terminal of a secondary winding 99 is coupled to the ground terminal of the deflection unit 9 and the other terminal is coupled via a diode D to an output of the deflection unit to supply the high DC voltage (EHT). A capacitor C which may be a "real" capacitor or a parasitic stay capacitance is coupled parallel to the series arrangement of the diode D and the secondary winding 99 of the line output transformer. The line output transformer operates in the conventional manner, i.e. during the retrace period of the line deflection the line deflection section produces a pulse shaped signal (the flyback pulse) at the terminal of the primary winding 98. This pulse shaped signal is transferred through the line output transformer LOT to the output of the deflection unit, and will be stored and filtered in the capacitor C.

As described above (see also FIG. 1) the ground terminal 21 of the deflection unit 9 is coupled to a conductor 19.

As is shown in FIG. 2 the conductor forms one turn around the width coil Lw and will then be coupled to the outer coating 23 of the display tube 7 (see FIG. 1).

To generate the required negative pulse, it is essential that the conductor forms the turn(s) around (for example) the width-coil in the correct direction (i.e. counterclockwise or clockwise, dependent on the coil structure), otherwise it will again induce a positive pulse and even worsen the situation.

As the level of improving the AEF2 is greatly dependent on the amplitude of the negative pulse which has been generated, it is very important to generate the exact amount of amplitude.

There are two parameters to vary the amplitude of the subject negative pulse. The first parameter is the loop dimension. The smaller the loop dimension, the larger the generated pulse will be. The second parameter is the number of turns around one of the deflection coils. The more turns, the larger the pulse will be.

The loop dimension and the number of turns are matters of design and depend on the specific display device.

In principle, it is possible to form a certain number of turns around, for example, the width coil and an (identical or different) number of turns around, for example, the linearity coil, etc.

I claim:
1. A display device comprising
   a display tube having at least one control electrode for generating an electron beam, a display screen for displaying a video signal and an inner coating at the inside of the display tube and an outer coating at the outside of the display tube, a deflection unit for deflecting the electron beam across the display screen, said deflection unit comprising at least a line deflection coil and a field deflection coil and a line output transformer having a primary winding coupled to a line deflection section of the deflection unit and a secondary winding having a first connector coupled to a ground terminal and a second connector coupled to the inner coating of the display tube for generating a high DC voltage, characterized in that, the first connector of the secondary winding is coupled to the outer coating of the display tube by means of a conductor which has at least one turn around one of the coils of the deflection unit.
2. A display device as claimed in claim 1, characterized in that the at least one turn of the conductor is formed around a width coil of the deflection unit.
3. A display device as claimed in claim 1, characterized in that the at least one turn of the conductor is formed around the secondary winding of the line output transformator.
4. A display device as claimed in claim 1, characterized in that the at least one turn of the conductor is formed around a linearity coil of the deflection unit.

* * * * *